United States Patent [19]

Scholle

[11] 4,091,192
[45] May 23, 1978

[54] PAIRED BATTERY GRIDS WITH SEVERABLE BRACE, PLASTIC LUGS, AND LEAD LUG

[75] Inventor: William R. Scholle, Corona del Mar, Calif.

[73] Assignee: Scholle Corporation, Northlake, Ill.

[21] Appl. No.: 762,756

[22] Filed: Jan. 26, 1977

[51] Int. Cl.² .......................................... H01M 4/02
[52] U.S. Cl. ................................. 429/211; 429/234; 429/241; 428/43; 428/58; 428/137
[58] Field of Search ............... 429/211, 234, 241, 233; 29/2

[56] References Cited
U.S. PATENT DOCUMENTS

| | | | |
|---|---|---|---|
| 2,684,396 | 7/1954 | Barrett | 429/243 |
| 2,716,146 | 8/1955 | Raney | 429/243 |
| 3,738,871 | 6/1973 | Scholle | 429/211 X |
| 3,956,012 | 5/1976 | Scholle | 429/234 |

Primary Examiner—Charles F. LeFevour
Attorney, Agent, or Firm—Gary, Juettner & Pyle

[57] ABSTRACT

Relates to battery grids for storage battery plates of the accumulator type, wherein the grids are initially die cast-injection molded in joined pairs of lead and plastic in a single mold. Each grid of the pair includes a plastic latticework with a lead conductor embedded therein, and a common lead lug extends between the grids and is connected at its ends with the conductors. Plastic lugs extend outward from opposite sides of the pair of grids to facilitate support of the grids during transport through subsequent manufacturing (pasting, drying, etc.) to form battery plates. The plastic lugs are later severed from the grids, and the lead lugs are cut in half between each pair of grids to form two separate battery plates, with each half of the severed lead lug providing a separate lug for each plate.

9 Claims, 6 Drawing Figures

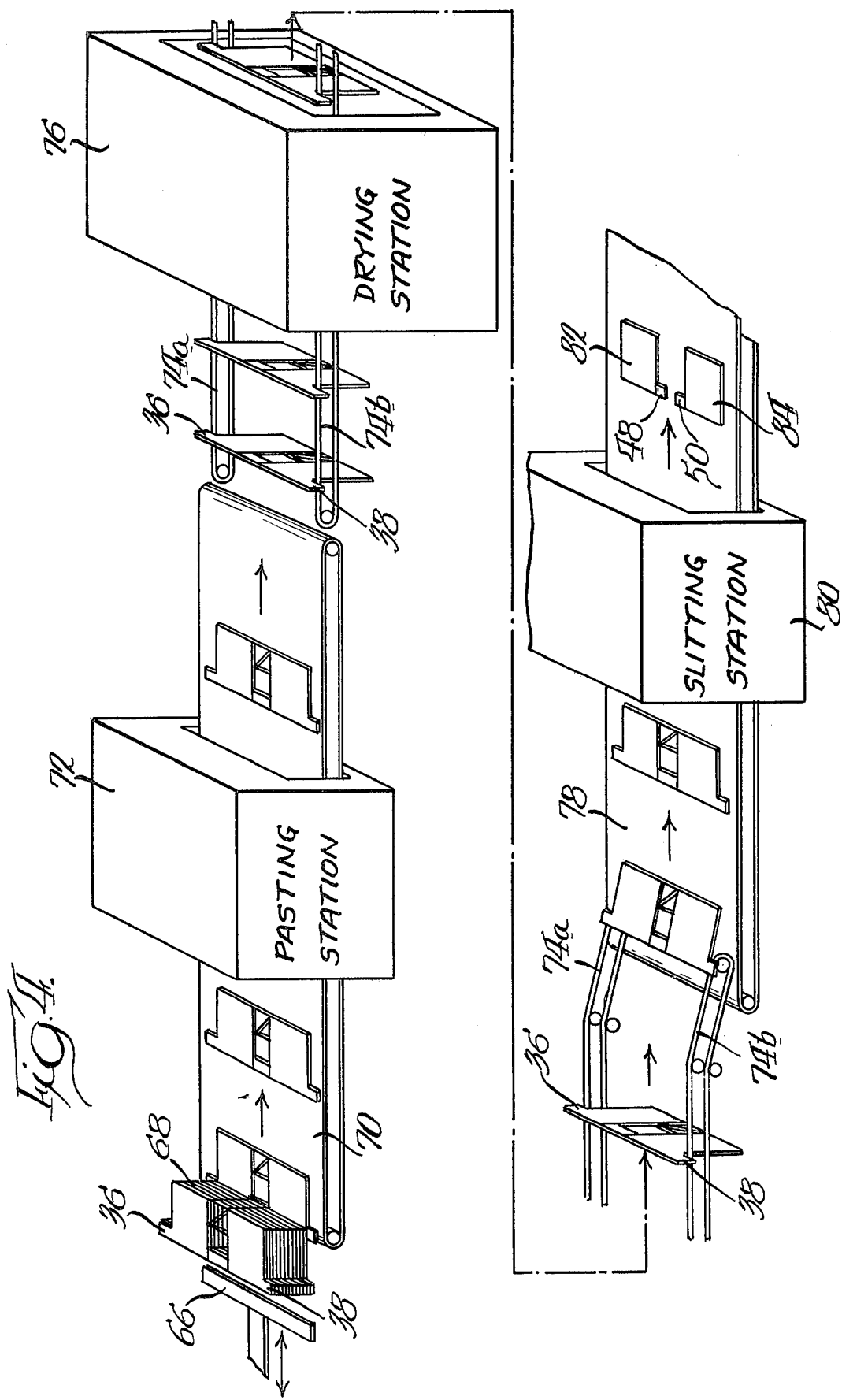

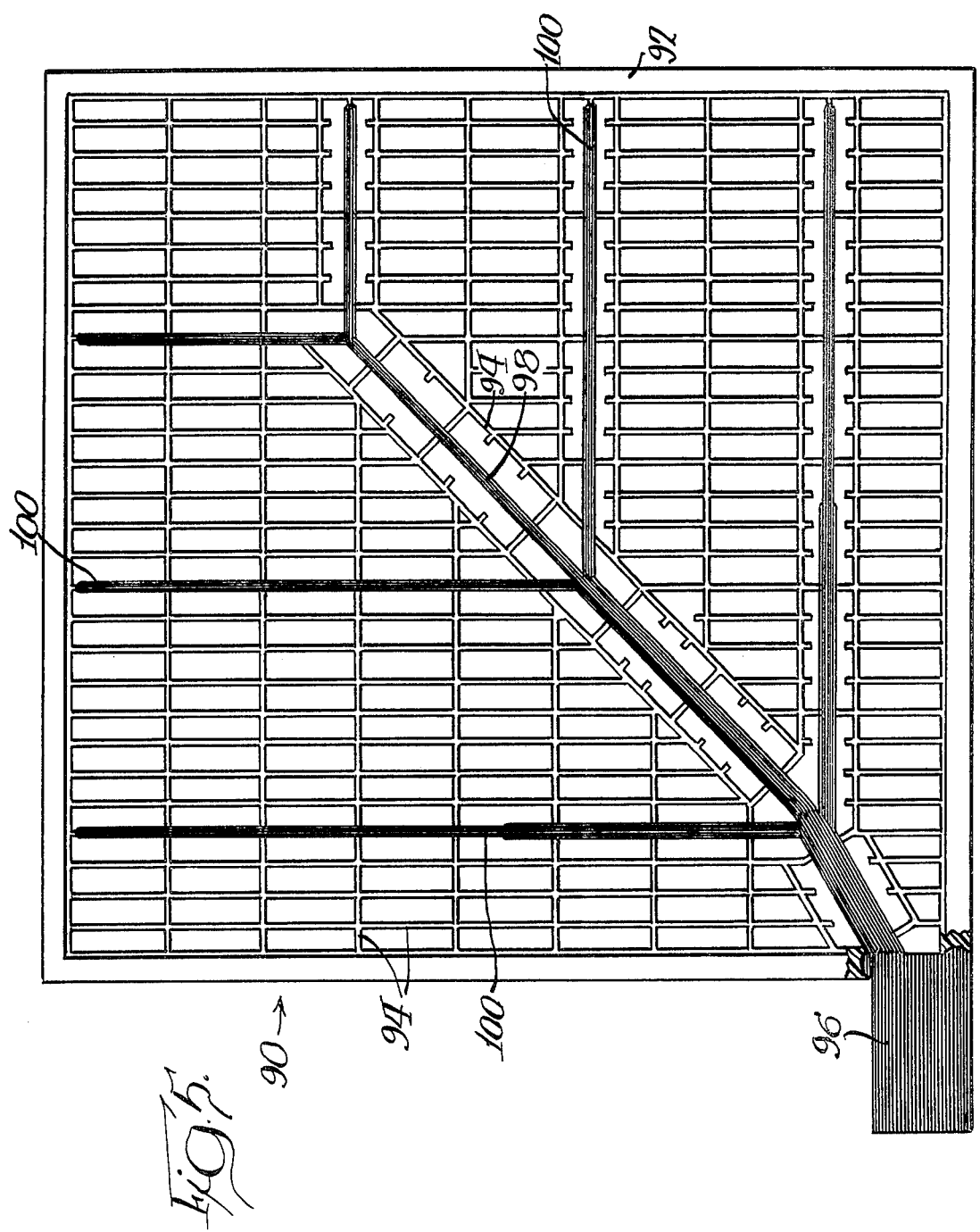

PAIRED BATTERY GRIDS WITH SEVERABLE BRACE, PLASTIC LUGS, AND LEAD LUG

BACKGROUND OF THE INVENTION

The present invention relates to battery grids and to methods of making the same, and in particular to a battery grid for a battery plate of the accumulator type and to a method of making the same.

Present day battery grids are often made of plastic material which acts as a mechanical frame to hold lead oxide paste, and are provided with a conductor for contacting the paste. Such grids frequently are used in automobile batteries, and when pasted are called battery plates. Lead is commonly used as the conductor since it is relatively insoluble in sulfuric acid which serves as the electrolyte, and is normally alloyed with calcium or antimony for rigidity, as pure lead is relatively soft. Other metals that are good conductors, such as copper, are soluble in sulfuric acid and would poison a lead acid battery.

As is well known, the grid generally comprises a rectangular frame formed with rectangular openings and a laterally projecting lead lug on its periphery, connected to the conductor, by means of which a plurality of grids of similar polarity may be fused together or otherwise electrically connected in parallel as by a bar leading to a battery post.

Normally, the plastic grid with conductor and lead lug is further manufactured by pasting the individual grids with a paste of lead oxide containing some sulfuric acid. These pasted grids are then dried and later subjected to an electrical charge while in sulfuric acid, whereby one group of plates called the negative plates have their lead oxide converted to lead, and another group of plates called the positive plates have their lead oxide converted to lead dioxide. A series of plates is then placed in a cell with alternating negative and positive plates and with a separator between each plate of, for example, fluted wood, perforated rubber, or the like. The battery is then filled with a dilute solution of sulfuric acid.

A cell may comprise any number of plates, with the positive plates being connected in parallel and the negative plates being connected in parallel, so that the entire cell has a desired amperage rating. In a lead oxide battery, the cell typically exhibits a voltage of approximately 2.1 volts, and depending on the desired voltage of the battery the requisite number of cells are connected in series, for example six cells connected in series for a 12-volt battery.

In the manufacture of battery grids, various techniques have heretofore been sued to form the conductor on the plastic lattice or frame. For example, the plastic frame and a lead grid in the shape of the conductor may separately be made, and the grid set into recesses formed in the frame to define the conductor. Or the lead grid may directly be embedded into the plastic frame in a molding process or, conversely, the frame may be joined with the lead grid by laminating, inserting or other means. Any of these previous manufacturing techniques require several separate and distinct steps for implementation, and therefore are time consuming and costly.

Once a battery grid is fabricated, the aforementioned further manufacturing thereof to produce a battery plate is ordinarily performed by automatic process. The grid is transported sequentially through various stations whereat operations performed thereon (i.e. pasting, drying, etc.) result in the battery plate. To facilitate support of the grids during transport, the grids often are formed in pairs joined by severable plastic legs, with the lead lugs of the grids extending outward from opposite sides of the pair. The grids are then supported by the lead lugs during transport between and through the manufacturing stations. Unfortunately, the lead lugs are relatively soft, and may deform in supporting the grids, particularly when the weight of the lead oxide paste is added thereto. Further, where the lugs are formed by extrusion, their positioning on opposite sides of the pair of grids requires lengthy sprues, so that a significant amount of lead remains in the sprues which must be broken off, remelted and reused.

OBJECTS OF THE INVENTION

An object of the present invention is to provide battery grids of an initial structure which facilitates handling and manufacture thereof, and a method of making the same.

Another object of the invention is to provide a structure for battery grids which are initially formed in pairs, and a method of making the same.

A further object of the invention is to provide battery grids of a type including a plastic frame and a lead lug and conductor supported thereon, and a method of injection molding the same in a single molding die.

SUMMARY OF THE INVENTION

In accordance with the present invention, a battery grid structure is comprised of integrally joined pairs of grids. Each grid of the pair includes a plastic frame including a latticework with a lead conductor embedded therein. A lead lug extends between the frames and connects at its ends with the conductors, and at least one plastic brace extends between the frames and maintains the grids, along with the lead lug, in a side by side relationship. A pair of plastic lugs extend peripherally outward from opposite sides of the frames.

The plastic lugs have sufficient strength to support the paired grid structure therebetween during transport through subsequent manufacturing, such as pasting, drying etc., during which the paired grid structure is manufactured into paired battery plates. After manufacturing, two separate battery plates may readily be obtained by severing the plastic brace and the plastic lugs from the frames, and by severing the lead lug centrally thereof, each half of the severed lead lug providing a lug for its associated plate.

In accordance with one method of making the paired battery grid structure, the lead lug and conductors are simultaneously and integrally molded, and the plastic frames are then integrally molded therearound with the latticeworks surrounding the conductors.

In a preferred method of manufacture, the paired battery grid structure is die cast-injection molded in a molding die having runners formed therein defining the structure. The method comprises blocking first those runners in the die defining the integral plastic member from those defining the lead lug and conductors. Heated lead is then injected into the runners defining the lead lug and conductors, and allowed to solidify. The previously blocked runners are then unblocked, and plastic is injected therein to form the integral plastic frames around the lead lug and conductors.

The invention thus provides a paired battery grid structure which is uniquely manufacturable in a single injection molding die in a process which lends itself to automatic control for economical mass production of the structures.

Other objects, advantages and features of the invention will become apparent from the following detailed description thereof, when taken in conjunction with the accompanying drawings.

BRIEF DESCRIPTION OF THE DRAWINGS

FIG. 4 is a diagrammatic showing of apparatus and steps used in manufacturing the battery grids of the invention into battery plates, particularly illustrating the utility of the plastic lugs on the battery grids in supporting paired grids for transport between sequential manufacturing operations, and FIG. 5 is a plan view of a single battery grid of the lead-plastic type, structured in accordance with another embodiment of the invention, and may also be considered a cross-sectional view of a die cast injection mold showing runners therein for molding the grid.

DETAILED DESCRIPTION

Figure 1:
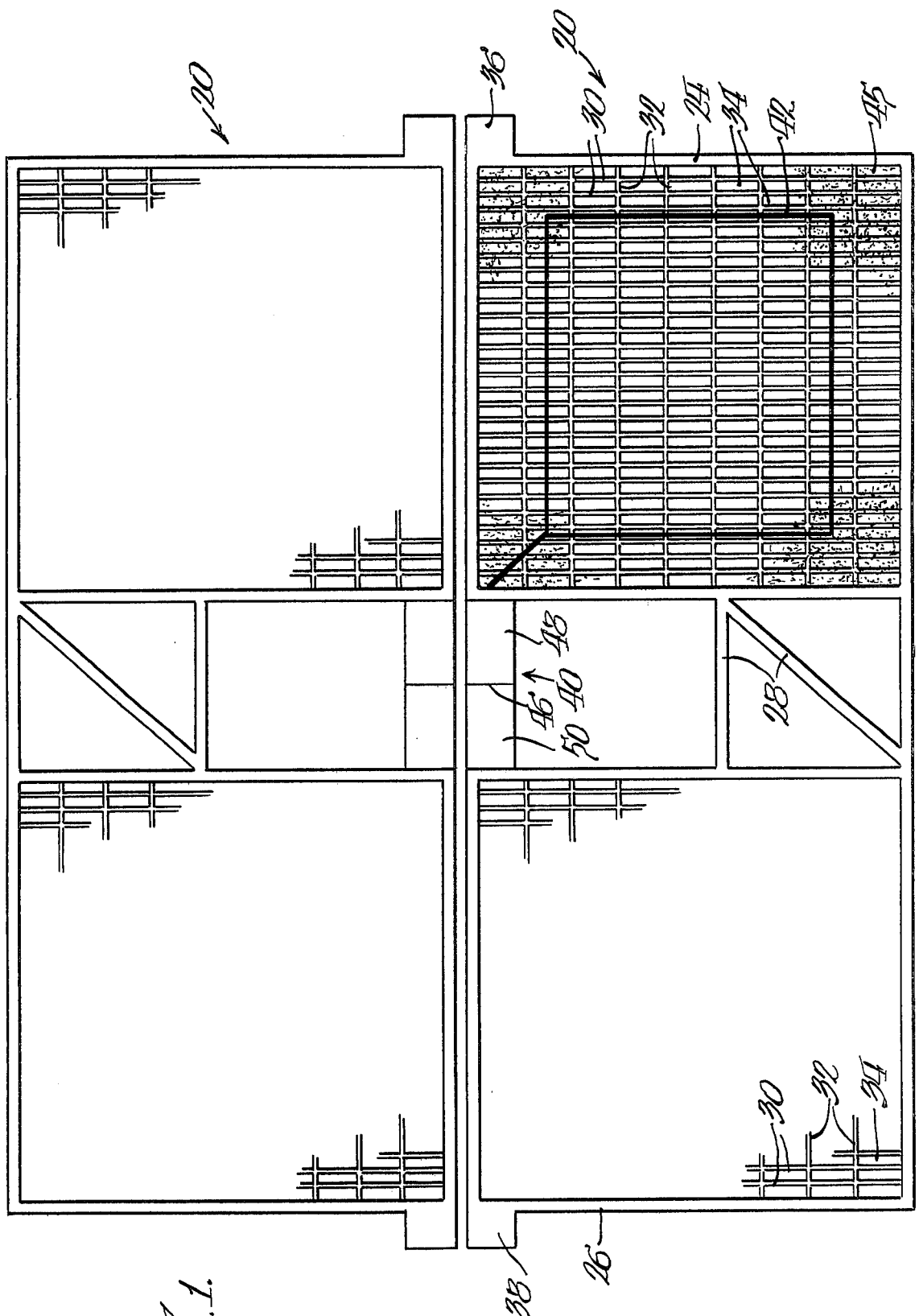
FIG. 1 is a plan view of two joined pairs of battery grids of the composite lead-plastic type, structured in accordance with one embodiment of the invention, and may also be considered a cross-sectional view of a die cast injection mold showing runners therein for molding the battery grid structures.

Referring to FIG. 1 of the drawings, there are shown two identical paired battery grids, each indicated generally at 20, structured in accordance with one embodiment of the invention. With reference only to the lower paired grids, it being understood that a like description applies to the identical upper grids, the grids include an integral plastic member having a pair of rectangular frames 24 and 26 joined in a spaced side by side relationship as by a plurality of severable braces or legs 28 extending between facing inner sides of the frames. Each frame has a gridwork or latticework formed within a central open area thereof by a plurality of intersecting vertical components 30 and horizontal components 32, which together define a plurality of rectangular apertures 34. The frames also include respective plastic lugs 36 and 38 extending peripherally from opposite outer sides thereof.

A lead lug, indicated generally at 40, extends between facing sides of the frames, and individual lead conductors 42 of generally rectangular shape are supported by the latticework in each of the frames, and are each connected with a respective opposite end of the lead lug. In the practice of the invention the lead lug and the conductors are integrally formed, the lead lug is molded at each of its ends within the frames, and the conductors are molded within the vertical and horizontal components defining the latticeworks, as will be described.

The plastic lugs 36 and 38 are for supporting the paired battery grids during transport between subsequent manufacturing operations wherein, for example, the apertures 34 are filled with lead oxide paste 45 as is conventional, and the paired grids are otherwise manufactured into battery plates. When such manufacturing is completed, the plastic lugs and the braces 28 are severed from the frames, and the lead lug is severed at its center, as along a score line 46, to form two separate battery plates for use in a lead-acid battery. Each battery plate then has an individual lead lug 48 and 50, which may be electrically connected with the lugs of other plates of like polarity to form a cell of the battery. The cell is customarily filled with dilute sulfuric acid as an electrolyte, and to this end the plastic material of the frames should not only be acid resistant, but should also be sufficiently rigid to be able to support the lead oxide as initially pasted thereon or as subsequently converted by charging or discharging. A particularly suitable plastic is polystyrene, others being polyethylene, polypropylene, polycarbonates and acrylates.

The paired battery grids 20 are preferably die cast-injection molded in a single molding die having runners for forming both the integral plastic member and the integral lead lug and conductors. Such a molding die, if shown in cross-section through the runners, would appear the same as the paired grids 20 of FIG. 1 except, of course, without the paste 45. Accordingly, there is no need to separately illustrate the molding die, since such would be redundant to FIG. 1. As the paired grids include two integral components, one of lead and one of plastic, such a molding die need have only two points of injection, for example an injection point for the lead in the runner for the lug 40, and an injection point for the plastic in the runner for one of the braces 28.

Figure 2:
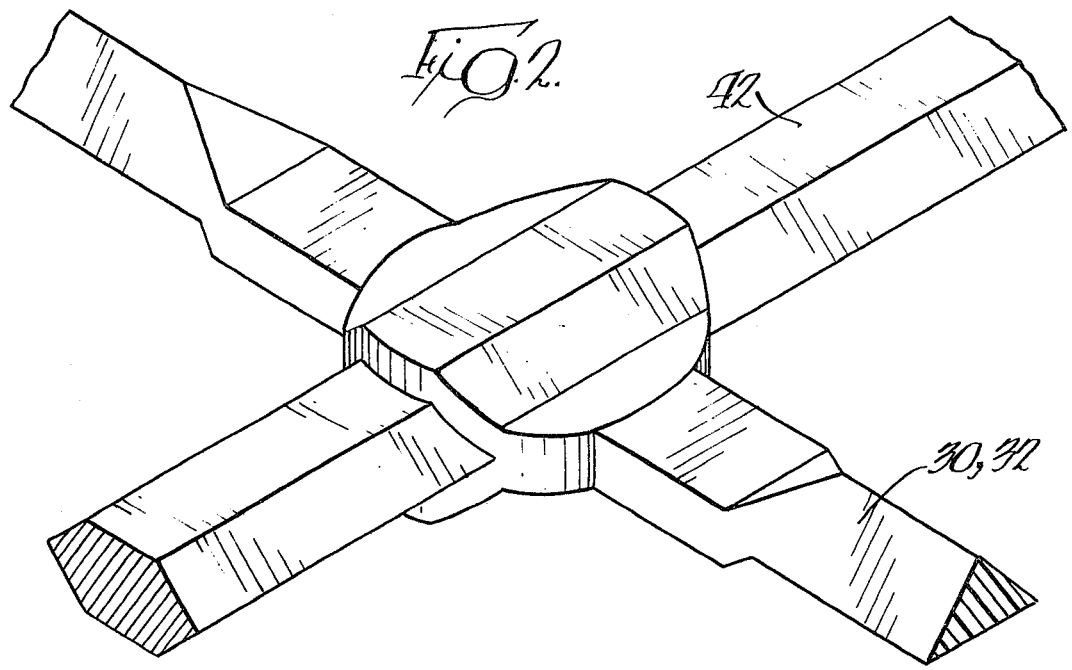
FIG. 2 is a perspective view of an intersection of lead and plastic in the battery grid structure.
Figure 3A:
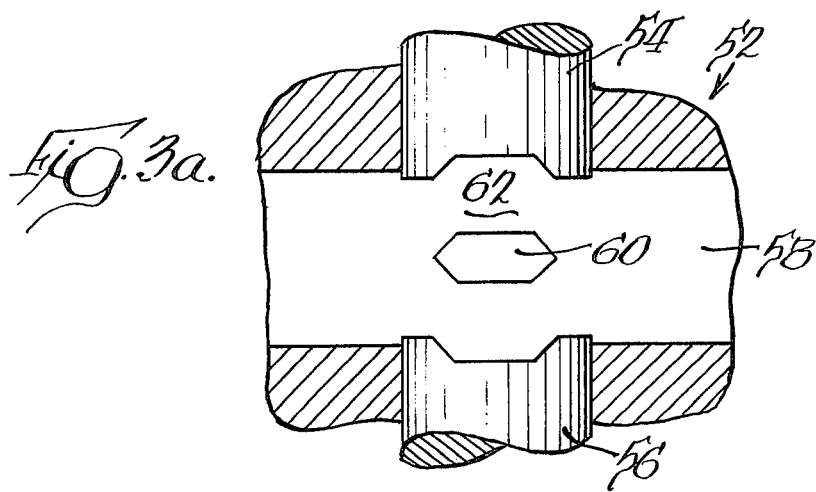
FIG. 3a is a cross-sectional view of a valve in the runners in the die at an intersection of lead and plastic, showing the valve in an open position.
Figure 3B:
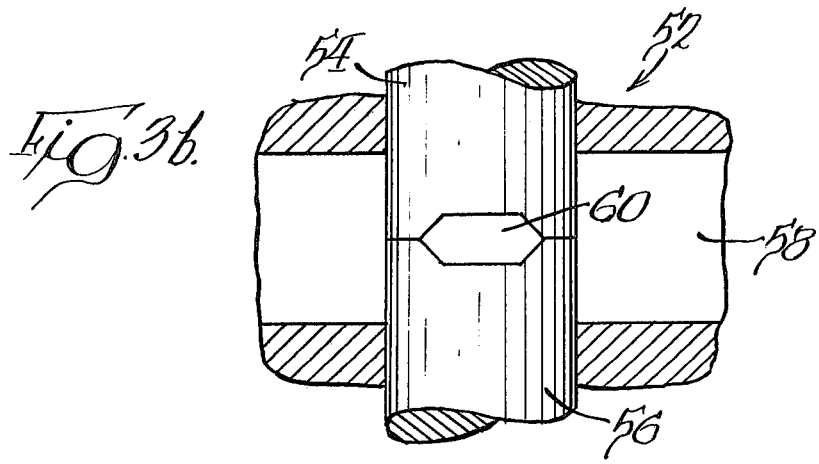
FIG. 3b is similar to FIG. 3a, and shows the valve in a closed position to seal the plastic runner from the lead runner.

Referring also to FIGS. 2 and 3, to mold the two discrete components of lead and plastic within the same molding die, so that as shown in FIG. 2 the lead conductors 42 are molded within a vertical or horizontal plastic component 30 or 32 at each intersection therewith, the die includes a respective valve means, indicated generally at 52, at each of the junction points between the plastic and the lead conductors, for example at each of the junctures between the lead conductors and a vertical or horizontal plastic component 30 or 32. Each valve means includes an upper valve pin 54 and a lower valve pin 56, which are simultaneously movable into or out of a juncture between a plastic runner 58 and a lead runner 60 in the die to open the plastic runner to the lead runner when in their outward position, as shown in FIG. 3a, or to close the plastic runner to the lead runner when in their inward position, as shown in FIG. 3b.

In molding the paired grids, the pins 54 and 56 are first moved to their inward position, and lead heated to a molten state is injected into the runners therefor in the die to form the integral lead lug and conductors. During this lead injection step, the valve pins effectively confine the lead to the runners therefor, and preclude entry of lead into the runners for the plastic. After injection of the lead, a refrigerant is preferably used to cool the lead as quickly as possible, during which time the valve pins are retracted. After the lead has solidified, but while still hot, molten plastic is injected into the runners therefor in the die to form the integral plastic member. During injection of the plastic the retracted valve pins, with reference to FIG. 3a, form a chamber 62 around the lead component at each of the intersections of a plastic runner therewith, whereby the plastic flows around the lead to mold or embed the lead therewithin. After the plastic has solidified and cooled, the grids are removed from the die for the aforementioned subsequent manufacturing.

It can now be appreciated that the paired battery grid structure offers significant economies in its manufacture and use. The relatively rigid outwardly extending plastic lugs 36 and 38 provide firm support for transport of the paired grids through subsequent operations, which support function is conventionally accomplished by forming the relative soft and bendable lead lugs 48 and 50 to extend peripherally outwardly from the grids. Further, the use of plastic lugs permits the lead lugs to be formed integrally together between the grids, enabling use of a single lead injection point in the die with attendant short sprue length, thus minimizing the amount of lead subsequently required to be removed from the sprue.

Also, pure lead, which is too soft and flexible to be used in a grid by itself or to be handled separately, becomes entirely functional in the injection molding process of the invention and when stiffened by plastic, thereby eliminating use of such materials as antimony and calcium in stiffening the lead, these materials not only being expensive, but costly to incorporate with the lead and to control. Elimination of the alloy system beneficially eliminates battery self-discharge, thereby allowing manufacture of essentially maintenance free batteries.

Additional economies may be realized by simultaneously molding in the same die two paired battery grids, as shown in FIG. 1. In this case, the die is configured to form the lead lug of each of the paired grids adjacent to one another to minimize sprue lengths. Of course, additional similar pairs of paired grids could, as desired, also be formed in the same molding die, such as four or eight paired grids.

The particular use of the plastic lugs 36 and 38 in supporting the grids during transport between successive manufacturing operations can be appreciated by reference to FIG. 4, wherein is shown diagrammatically a typical sequence of manufacturing operations. The sequence begins with an indexing mechanism 66 which sequentially moves individual ones of paired battery grids from a stack 68 thereof onto a conveyor 70. Instead of the mechanism 66, the grids could just as readily be positioned on the conveyor by a transfer wheel (not shown) having spaced pairs of teeth on its periphery for engaging the plastic lugs of successive grids and for transferring the grids to the conveyor. The conveyor then moves the grids through a pasting station 72 whereat a lead oxide paste is applied to the latticework areas thereof.

After pasting, the grids are transferred from the conveyor 70 to a pair of spaced conveyors 74a and 74b, which support the grids therebetween by means of the tabs 36 and 38, and move the grids through a drying station 76 for drying the lead oxide paste thereon. To this end, it is appreciated that the plastic lugs are sufficiently rigid to securely support, without deformation or breaking, the now paste laden grids.

After drying, the grids are transferred from the conveyors 74a and 74b to a more rapidly moving conveyor 78, which carries the paired grids through a slitting station 80 whereat the plastic lugs 36 and 38, and the legs 28, are severed therefrom, and whereat the lead lug 40 is severed along the slit line 46. As the grids exit from the slitting station they then comprise a pair of completed battery plates 82 and 84, ready for assembly in a battery.

Referring to FIG. 5, there is shown a structure for the individual battery grids of FIG. 1 in accordance with another embodiment of the invention. The battery grid, indicated generally at 90', is similar to the individual grids of FIG. 1 to the extent that it includes an integral plastic member having a rectangular frame 92 with a latticework formed therein by components 94, and a lead lug 96 extending peripherally from the frame. The structure differs from that in FIG. 1, however, by the lead conductor supported on the latticework, which is configured to improve the electrical contact made thereby with the lead oxide paste. In this case, the conductor includes a trunk portion 98 running diagonally across the grid and in contact with the lead lug, and a plurality of branch portions 100 extending outward therefrom. The particular configuration of the conductor increases the contact area with the paste, and provides for more uniform contact with the paste to decrease the resistance to a flow of current therethrough, whereby the efficiency and capacity of a battery manufactured with such grids is increased.

The invention thus provides unique paired battery grid structures formed with removable means for securely supporting the structures during subsequent manufacture thereof, and an economical and improve method of making the same.

While particular embodiments of the invention have been described in detail, it is understood that various modifications and other embodiments thereof may be devised by one skilled in the art without departing from the spirit and the scope of the invention, as defined by the appended claims.

What is claimed is:

1. In a paired battery grid structure, an integral plastic member having a pair of side-by-side rectangular frames each with a latticework of intersecting components in a center area thereof, a severable brace extending between facing sides of said frames securing said frames in said side-by-side relationship, and a pair of severable frame lugs each extending peripherally outward from a respective outer side of each of said frames opposite from said facing sides; a severable lead lug extending between and secured to said facing sides of said frames, and a pair of lead conductors each supported by a respective one of said frame latticeworks and each electrically connected with an end of said lead lug secured to said respective frame, said frame lugs having sufficient strength for supporting said paired grid structure therebetween, whereby two separate battery grids are obtainable by severing said frame lugs and brace from said frames, and by severing said lead lug centrally thereof.

2. In a battery grid structure as set forth in claim 1, said lead lug extending between said facing sides at like ends thereof, said frame lugs extending from said outer sides at like ends thereof.

3. In a battery grid structure as set forth in claim 1, said lead lug extending between said facing sides at like ends thereof, said frame lugs extending from said outer sides at like and opposite ends thereof.

4. In a battery grid structure as set forth in claim 1, said lead conductors being formed integrally with said lead lug.

5. In a battery grid structure as set forth in claim 4, said intersecting components being intersecting horizontal and vertical components, said lead conductors being embedded in said horizontal and vertical components of each of said latticeworks.

6. In a battery grid structure as set forth in claim 4, said lead conductors each being generally rectangular in shape and positioned in said grids with sides thereof parallel to sides of said frames.

7. In a battery grid structure as set forth in claim 4, said lead conductors each having a center conductor portion electrically connected with said lead lug secured to said respective frame, and a plurality of branch conductor portions extending outward from said center portion at spaced positions therealong.

8. In a battery grid structure as set forth in claim 7, said branch conductor portions extending generally parallel to sides of said respective frame from opposite sides of said center conductor portion at spaced positions therealong.

9. In a battery grid structure as set forth in claim 4, said lead lug having a score line centrally thereof between said frames to facilitate subsequent severing of said lug.

* * * * *